Dec. 3, 1963  E. F. WEBB  3,112,507
WINDSHIELD CLEANING SYSTEM PUMP ASSEMBLY
Filed Dec. 1, 1961  2 Sheets—Sheet 1
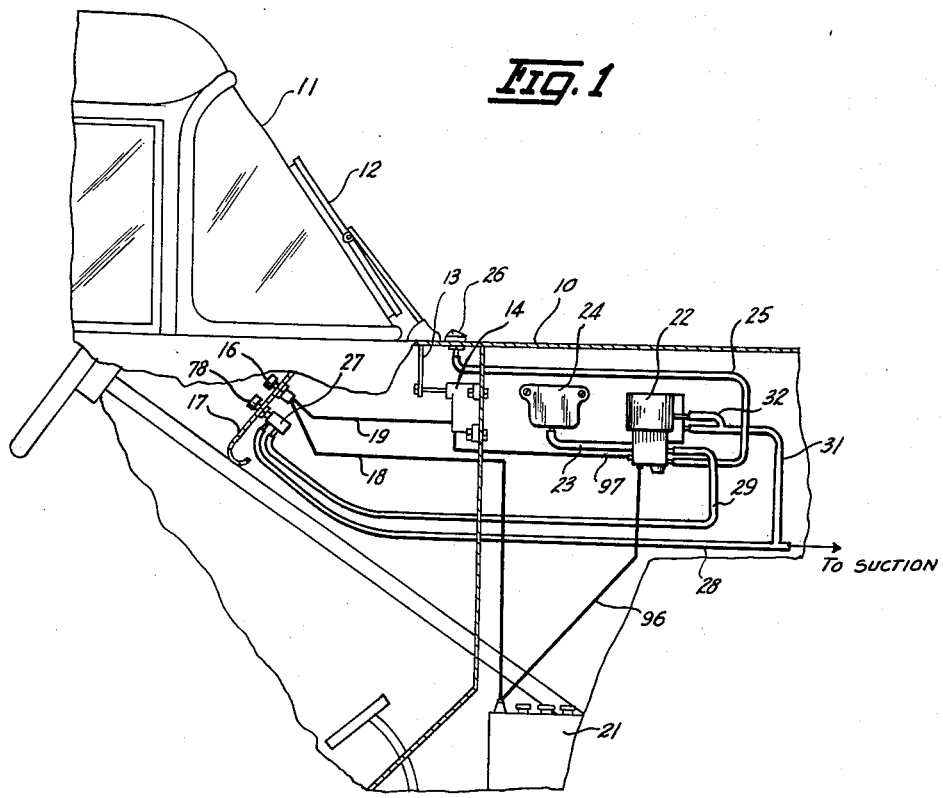
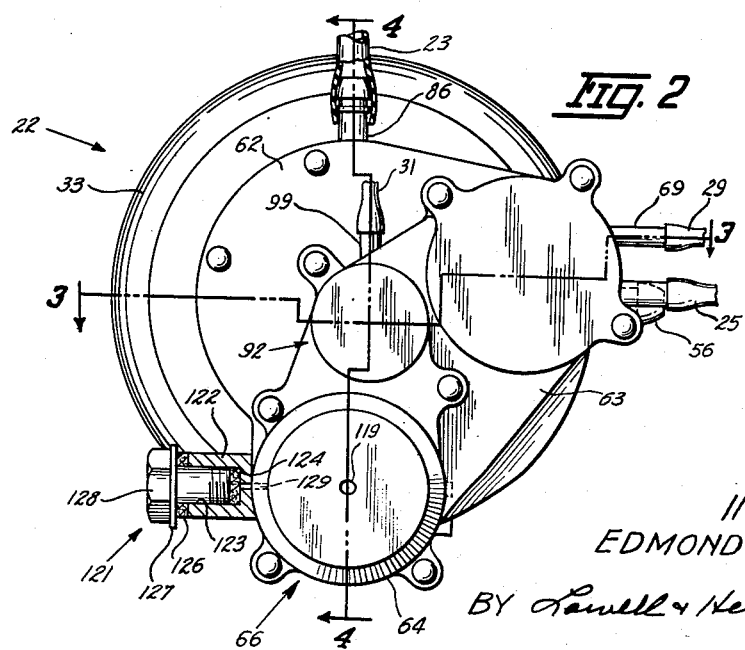
INVENTOR.
EDMOND F. WEBB
BY Lowell & Henderson
ATTORNEYS.

Dec. 3, 1963 E. F. WEBB 3,112,507
WINDSHIELD CLEANING SYSTEM PUMP ASSEMBLY
Filed Dec. 1, 1961 2 Sheets-Sheet 2
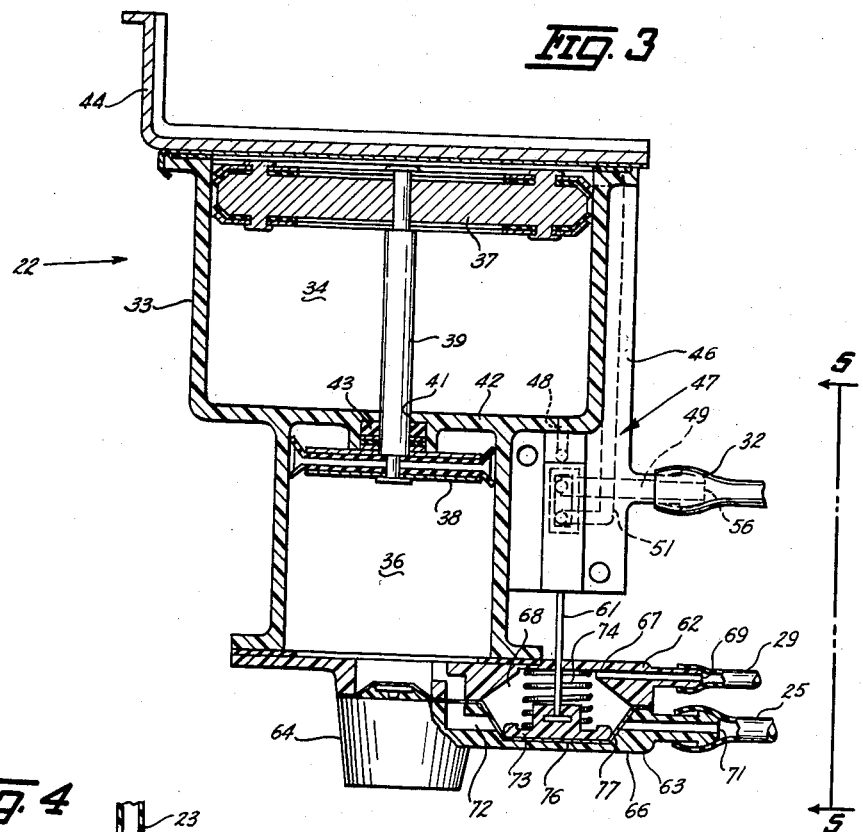
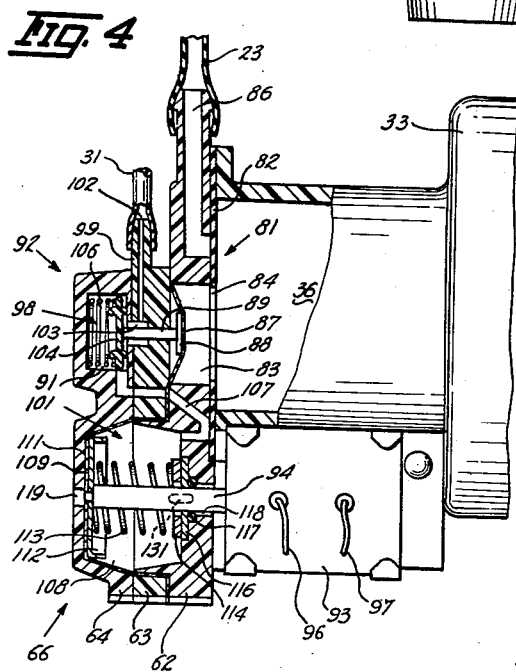
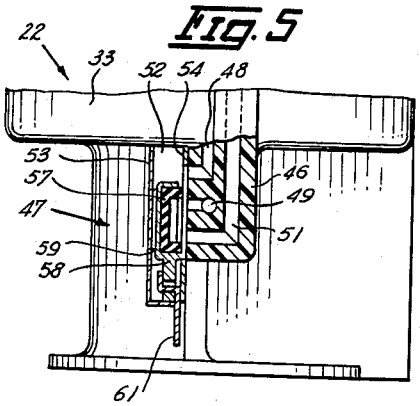
INVENTOR.
EDMOND F. WEBB
BY Lowell & Henderson
ATTORNEYS.

United States Patent Office 3,112,507
Patented Dec. 3, 1963

3,112,507
WINDSHIELD CLEANING SYSTEM PUMP ASSEMBLY
Edmond F. Webb, Franklin, Mich., assignor to The Delman Company, Cookeville, Tenn., a corporation of Tennessee
Filed Dec. 1, 1961, Ser. No. 156,208
14 Claims. (Cl. 15—250.02)

This invention relates to a vehicular windshield clearing system and more particularly to a pneumatically operated washer pump assembly including means for controlling the operation of a wiper motor therewith.

It is an object of this invention to provide an improved windshield washer pump assembly for use in a windshield clearing system.

It is a further object of this invention to provide a pump assembly including means operably responsive thereto for utilizing washing fluid discharged by the pump assembly for controlling the operation of the wiper motor, whereby operation of the wiper motor is dependent on there being a supply of washing fluid available.

Another object of this invention is to provide in a windshield clearing system, a pump assembly including means fluid responsive thereto for assuring operation of the wiper motor whereby washing fluid is discharged against the windshield substantially simultaneously with oscillation of the wiper blade.

Yet another object of this invention is the provision of a pump assembly as characterized hereinbefore which includes means responsive to the cessation of washing fluid flow for de-actuating the wiper motor subsequent in time to the washing fluid cessation.

Another object of this invention is the provision of a pump assembly capable of attaining the above-mentioned objectives which is economical to produce, simple in construction and effective in operation.

These and other objects and advantages of this invention will become readily apparent upon reference to the following description when taken with the accompanying drawings, wherein:

FIG. 1 is a fragmentary elevational view of a motor vehicle equipped with a windshield clearing system including a washer pump assembly of the present invention;

FIG. 2 is an enlarged bottom plain view of the washer pump assembly of the invention, with certain parts broken away and others shown in section for clarification;

FIG. 3 is a sectional view taken along the line 3—3 in FIG. 2;

FIG. 4 is a sectional view taken along the line 4—4 in FIG. 2; and

FIG. 5 is a side elevational view of the washer pump assembly as viewed from the line 5—5 in FIG. 3, with certain parts broken away and others shown in section for clarity of illustration.

Referring now to the drawing, a motor vehicle is illustrated having a cowl 10 and a windshield 11 mounted thereon. A wiper unit comprises a wiper blade 12, a linkage 13, and an electric wiper motor 14. When it is desired to operate the wiper unit alone, the operator actuates a switch 16 mounted on the dashboard 17. This closes a circuit through leads 18 and 19, the grounded electric motor 14 and a grounded battery 21. The wiper will continue to oscillate until the switch 16 is again actuated, thus breaking the circuit.

The washer unit comprises a pneumatically actuated pump assembly 22 operable to withdraw fluid through a conduit 23 from a reservoir 24. The pump assembly 22 discharges the fluid through a conduit 25 to a nozzle 26 mounted on the cowl 10, from which the fluid is directed against the windshield 11 and into the path of the wiper 12. For controlling the operation of the pump assembly 22, a control valve 27 is mounted on the dashboard 17 and which is operable to connect a suction conduit 28 from the intake manifold system of the vehicle to another conduit 29 leading to the pump assembly 22. A pair of conduits 31 and 32 (FIG. 1) are connected to the suction line 28 for continually applying a suction pressure to the pump assembly 22 as described in detail hereinafter.

Referring to FIGS. 2-5, inclusive, the pump assembly 22 includes a housing 33 including a pump actuating chamber 34 and a pump chamber 36. A piston 37 is reciprocally mounted within the actuating chamber 34 and a piston 38 is reciprocally mounted in the pump chamber 36. To interconnect the pistons 37 and 38 for common movement, a common piston rod 39 is inserted through a bore 41 formed in a wall 42, and is connected at each end to one of the pistons 37 and 38. A seal 43 is provided at the bore 41.

A mounting bracket 44 is provided at the top of the housing 33, and at the side thereof a body 46 is provided integral with the housing 33 for enclosing the first valve unit 47 of a pneumatic valve assembly. As best shown in FIGS. 3 and 5, the first valve unit 47 includes a trio of ports 48, 49, and 51 formed in the body 46. The port 48 leads from the bottom of the pump actuating chamber 34 to the interior 52 of a valve cover 53 secured to the body 46, a gasket 54 being interposed. The port 49 leads from a fluid fitting 56, connected to the conduit 32, to the interior 52 immediately below the bore 48 outlet, and the port 51 leads from the upper end of the pump actuating chamber 34 to the interior 52 immediately below the port 49.

For always maintaining two outlets of the ports 48—51 in communication, a slide valve 57 is provided within the valve cover 53 and is held within a retainer 58 for reciprocal movement in the cover 53. A spring 59 maintains the retainer 58 and slide valve 57 against the body 46. In the normal position of the slide valve 57, as determined by an action wire 61 hereinafter described, the ports 49 and 51 are fluid connected whereby suction pressure from the conduit 28 (FIG. 1) is applied on the top side of the pump actuating chamber piston 37. As air under atmospheric conditions can enter the valve cover 53 (FIG. 5), it passes through the open port 48 into the pump actuating chamber 34 on the bottom side of the piston 37. Thus, the piston 37 is positioned as illustrated in full lines in FIG. 3, and consequently the pump piston 38 is at the top of its chamber 36.

Upward movement of the action wire 61 (FIGS. 3 and 5), moves the slide valve 57 to a position to cover ports 48 and 49, leaving port 51 open to the atmosphere. This results in a reversing of the pressure differential within the pump actuating chamber 34 so that the piston 37 is moved downwardly to the bottom of the chamber. Simultaneously with this movement and due to the rod 39, the pump piston also move downwardly to the bottom of its chamber 36. Thus, operation of the pneumatic first valve unit 47 effects a downward delivery stroke of the pump piston 38, and a sequential upward intake stroke thereof.

At the base of the housing 33, a trio of structures 62, 63, and 64 (FIGS. 3 and 4) are assembled together and attached to the housing 33 as a unitary body 66 for completing the valving arrangement. Complementary with the first valve unit 47, a second valve unit 67 (FIG. 3) of the pneumatic valve assembly is provided in the body 66 for actuating the action or control wire 61. The second valve unit 67 includes a chamber 68 open at its top to an inlet port 69 in communication with the conduit 29 from the control valve device 27 and open at its bottom to an outlet port 71 and to an inlet passage 72. The port 71 is in communication with the fluid conduit 25 leading to the nozzle 26, and the passage 72 is formed through the body 66, leading to the bottom of pump chamber 36.

Within the second valve unit chamber 68 (FIG. 3), the control wire 61 is attached to a piston 73 biased downwardly by a spring 74. In this normal position of the piston 73, a section 75 of a diaphragm 77 is held against the bottom of the chamber 68 thereby closing off the port 71 and the passage 72 from the chamber 68 below the diaphragm section 76. It will be noted that the normal position of the piston 73 results in the slide valve 57 (FIG. 5) also being at its normal position with the pump actuating piston 37 (FIG. 3) at the upper end of the chamber 34 poised to begin the downward delivery stroke for the pump piston 38.

Upon operation of the control valve device 27 to apply suction pressure through the conduit 29 to the second valve unit chamber 68, the diaphragm section 76 will raise (FIG. 3) the piston 73 against the bias of the spring 74. This movement results in the control wire 61 changing the position of the slide valve 57 (FIG. 5) whereby the changed pressure differentials in the pump actuating chamber 34 effects a downward movement of the pistons 37 and 38. The washing fluid in the pump chamber 36 is discharged through the passage 72 and into the second valve chamber 68. Within the chamber 68, the washing fluid engages and holds the diaphragm section 76 in its upper operative position so that the diaphragm section 76 and associated parts assume the role of a fluid valve device.

By this arrangement, the operator need merely momentarily actuate, by depressing, or pulling as the case may be, the knob 78 (FIG. 1) on the control valve device 27. Thus, even though the suction pressure is only momentarily applied to the chamber 68 (FIG. 3), the force of the fluid entering therein acts to maintain the slide valve 57 in its upper operative position. Simultaneously with this action, as the diaphragm section 76 is held raised, the discharge passage 72 is opened, and thus the fluid from the pump chamber 36 is discharged through the chamber 68 and the conduit 25 to the nozzle 26.

When fluid from the pump chamber 36 is exhausted, the spring 74 returns the piston 73 and diaphragm section 76 to their normal inoperative positions, thus closing off the port 71 and the passage 72, and returning the slide valve 57 to its normal position. The resulting intake stroke of the pump piston 38 actuates a fluid valve device 81 (FIG. 4). The valve 81 includes a gasket 82 which opens to a large bore 83 formed in the body 66, and which has a flap valve 84 (FIG. 4) integral therewith and extended over a fluid passage 86 connected to the reservoir conduit 23 and opening into the pump chamber 36. The valve 81 includes further another section 87 of the diaphragm 77 extended across the bottom of the bore 83 and bonded to the top of a piston 88 the rod 89 (FIG. 4) of which reciprocally extends through the body 66 and into a cavity 91 formed therein.

When the pump chamber 36 has fluid therein, upon downward movement of the pump piston 38, the pressure of the fluid maintains the flap valve 84 closed over the passage 86 as the fluid is forced outwardly through the passage 72. As described hereinbefore, the passage 72 forms a secondary part of the fluid valve device 81 in that it directs the fluid through the pneumatic valve second unit 67 for maintaining that unit inoperable. Upon a return upward intake stroke of the pump piston 38, the suction created thereby raises the flap valve 84 and withdraws fluid from the reservoir 24 and through the conduit 23 and passage 86 into the pump chamber 36. The pump chamber 36 is thereby re-charged with fluid for the next cleaning cycle.

For coordinating the discharge of fluid through the nozzle 26 with energization of the wiper motor 14 to oscillate the wiper blade 12, a diaphragm valve 92 (FIG. 4) is provided in the body 66 for operating an electric switch 93 in response to the delivery and intake stroke of the pump piston 38. The switch 93 is shown here as being a two-pole, on-off type switch, actuated by a plunger 94, mounted on the pump assembly housing 33, and connected by leads 96 and 97 between the battery 21 and the wiper motor 14.

The diaphragm valve 92 (FIG. 4) includes a first valve assembly 98 connected by a fluid fitting 99 and the conduit 31 to the suction pressure source, and responsive via the piston 89 to movement of the pump piston 38. The valve 92 also includes a second valve assembly 101 operably connected to the electric switch plunger 94 and operably responsive to the application and withdrawal of suction pressure by the first valve assembly 98.

More particularly, the first valve assembly 98 includes the cavity 91 formed in the body 66, and open to a passage 102 in the fitting 99 and to a chamber 103 below the cavity 91. Within the chamber 103, a piston valve 104 is reciprocally mounted and secured to the end of the piston rod 89. A spring 106 is mounted in the chamber 103 and engages the piston valve 104 to normally maintain it in a fluid tight relation against the upper wall of the chamber 103, as best illustrated in FIG. 4. In this position of the piston valve 104, the passage 102, in which a suction pressure is continually applied, is closed off from a passage 107 leading from the chamber 103 to a chamber 108 for the second valve assembly 101.

In addition to the chamber 108 (FIG. 4), the second valve assembly 101 includes another section 109 of the diaphragm 87 normally held against the bottom wall 111 of the chamber 108 by a piston 112 which is secured to the outer end of the electric switch plunger 94. A spring 113 is mounted between the piston 112 and a retainer washer 114 for maintaining the piston 112 and the plunger 94 in the retracted position best illustrated in FIG. 4. In this normal, inoperative position of the plunger 94, the switch 93 is off. Another washer 116, having a bleed hole or passage (not shown) formed therein for a purpose hereinafter described, is secured in the body 66 adjacent the spring retainer washer 114, and an O-ring 117 is secured in a bore 118 in the body 66 for the plunger 94 for sealing purposes.

As described before, in the normal position of the piston valve 104 (FIG. 4), at which time the pump actuating piston 37 (FIG. 3) is in its upper inoperative position, the suction pressure is closed off from the second valve assembly chamber 108 and the electric switch 93 is off. However, upon downward movement of the piston 37, the resulting discharge of fluid results in a depression in the diaphragm section 87 (FIG. 4) and a downward movement of the piston 88. This movement is transmitted to a movement of the piston valve 104 against the spring 106, thus opening the suction pressure passage 102 through the chamber 103 to the internal passage 107.

Upon application of the suction pressure to the second valve assembly chamber 108, with the aid of atmospheric pressure on the other side of the diaphragm section 109 by means of an opening 119 in the bottom wall 111, the suction created in the chamber 108 causes the diaphragm section 109 to move away from the bottom wall 111 and raises the piston 112 toward the retainer washer 114 against the bias of the spring 113. This movement of the piston 112 and thus the plunger 94 closes the switch 93 and energizes the wiper motor 14. Thus simultaneous with and in direct response to the discharge of fluid from the pump chamber 36, the first valve assembly 98 of the diaphragm valve 92 is operable to apply suction pressure to the second valve assembly 101 for actuating the wiper motor 14.

When the fluid from the pump chamber 36 is fully discharged, the spring 106 (FIG. 4) moves the piston valve 104 to its closed position thus shutting off the application of suction pressure through the passage 107 to the second valve chamber 108. The vacuum created in the chamber 108 is gradually dissipated by the provision of an atmospheric bleed assembly 121 (FIG. 2) including a bleed body 122 integral with the valve body 66. Within the body 122, a bore 123 is formed for enclosing a plurality of felt plugs 124. A felt washer 126 and a regular washer 127 are interposed between the body 122 and a bleed screw 128 threaded into the bore 123.

Depending on the compression of the felt plugs 124 as determined by the position of the bleed screw 128 in the bore 123, air enters a passage 129, formed in the valve body 66 and in communication with the bore 123, at a certain rate, and then passes through the bleed hole or passage (not shown) in the washer 116 (FIG. 4) to the electric switch plunger 94. At the plunger 94, the atmospheric air bleeds into the chamber 108 and thus, aided by the spring 113, slowly overcomes the atmospheric air below the diaphragm section 109. This action effects a slow return of the plunger 94 to its normal inoperative position, thus opening the switch 93 to stop the wiper motor 14 subsequent in time to the cessation of the fluid discharge. To effect a fast movement of the plunger 94 near the end of its return stroke, a longitudinal depression or slab side 131 is formed on the plunger 94 so that as the slab side 131 is moved into communication with the washer 116, a quick entry of atmospheric air into the chamber 108 is provided.

In summation, a washer pump assembly 22 is disclosed for use in a windshield clearing system which includes a housing 33 having a pair of chambers 34 and 36 formed therein, and in which a pair of pistons 37 and 38, interconnected by a single rod 39, are reciprocally mounted. A pneumatic valve assembly is provided which includes a first valve unit 47 connected by the conduit 32 to a source of suction pressure and operable to effect a delivery and an intake stroke of the fluid pump piston 38. A second valve unit 67 is connected to a manually operable control valve 27 for operating the first valve unit 47.

Further, the pump assembly 22 includes a fluid valve device 81 which is responsive to the intake and delivery strokes of the pump piston 38 to deliver fluid into the pump chamber 36, and which is fluid interconnected with the pneumatic second valve unit 67 to utilize that unit as a secondary part of the fluid valve device 81 in maintaining the first valve unit 47 operable during discharge of the fluid and subsequent to the withdrawal of suction pressure therefrom.

Additionally, a diaphragm valve 92 is provided for energizing the wiper motor 14 simultaneously with discharge of the fluid from the pump chamber 36, and for providing a timed delay of de-actuation of the wiper motor 14 after the fluid has been discharged. The diaphragm valve 92 includes a first valve assembly 98 connected through conduit 31 to the suction pressure and responsive to action of the pump piston 38 via the first valve assembly 81 for applying the suction pressure to a second valve assembly 101. This assembly 101 is operably connected to the electric switch 93 for energizing the wiper motor 14 simultaneously with the fluid discharge. An air bleed assembly 121 is connected to the second valve assembly 101 for delaying the opening of the electric switch 93 relative to the exhaustion of fluid from the pump chamber 36.

Upon the exhaustion of the cleaning fluid, the second valve unit 67 operates the first valve unit 47 to effect an intake stroke of the pump piston 38, whereby the fluid valve device 81 is automatically operated to permit the flow of fluid from the reservoir 24 into the pump chamber 36. Simultaneously the first valve assembly 98 of the diaphragm valve 92 cuts off the supply of suction pressure from the second valve assembly 101, thereby effecting the timed opening of the wiper motor switch 93.

Although a preferred embodiment of the present invention has been described herein, various modifications and alterations can be made thereto within the full scope of the invention as defined in the appended claims.

I claim:
1. A pneumatically operated washer pump comprising:
   (a) a housing having a pair of chambers formed therein,
   (b) a pair of pistons reciprocally mounted each in a chamber and interconnected by a common rod,
   (c) pneumatic valve means mounted on said housing and operable in response to the application of a subatmospheric pressure thereto to alternately supply and exhaust air under subatmospheric pressure to opposite sides of the piston in one of said chambers to effect reciprocal movement thereof,
   (d) fluid valve means mounted on said housing and operable in response to said reciprocal movement to sequentially deliver and discharge fluid to and from one side of the piston in the other of said chambers, said fluid valve means operatively connected to said pneumatic valve means to maintain said pneumatic valve means operable subsequent to the withdrawal of said pressure,
   (e) wiper control means mounted on said housing, and
   (f) diaphragm means mounted on said housing, in fluid communication with said other chamber, and responsive to the application and withdrawal of fluid from said other chamber to operate said wiper control means.

2. A pneumatically operated washer pump comprising:
   (a) a housing,
   (b) pump means in said housing having an intake stroke and a delivery stroke,
   (c) pump actuator means in said housing and operably connected to said pump means, said pump actuator means responsive to pressure differentials to effect said pump means strokes,
   (d) pneumatic valve means mounted on said housing, fluidly connected to a source of suction pressure, and fluidly connected to said pump actuator means, said pneumatic valve means operable in response to the application of a suction pressure thereto to apply pressure differentials to said pump actuator means,
   (e) fluid valve means mounted on said housing, responsive to said intake stroke to supply fluid under pressure thereto, and responsive to said delivery stroke to discharge fluid therefrom, said fluid valve means operatively connected to said pneumatic valve means for supplying fluid thereto in response to said delivery stroke and maintaining said pneumatic valve means operable subsequent to a withdrawal of suction pressure therefrom,
   (f) wiper control means mounted on said housing, and
   (g) diaphragm means mounted on said housing, fluid connected to said suction pressure source, and responsive to said delivery stroke to actuate said wiper control means and responsive to said intake stroke to de-actuate said wiper control means.

3. A pneumatically operated washer pump comprising:
   (a) a housing,
   (b) a pump actuator chamber and a pump chamber separated therefrom, both chambers formed in said housing and in each of which a piston is reciprocally mounted,
   (c) a rod reciprocally mounted in said housing and interconnecting said pistons for transmitting movement of the pump actuator piston to the pump piston so that the pump piston has an intake stroke and a delivery stroke,
   (d) pneumatic valve means mounted on said housing, fluidly connected to a source of suction pressure, and fluidly connected to said pump actuator chamber for applying pressure differentials thereto to effect reciprocal movement of said pump actuator piston,
   (e) fluid valve means mounted on said housing, responsive to said intake stroke to supply fluid under pressure thereto, and responsive to said delivery stroke to discharge fluid therefrom, said fluid valve means operatively connected to said pneumatic valve means for supplying fluid thereto in response to said delivery stroke and maintaining said pneumatic valve means operable subsequent to a withdrawal of suction pressure therefrom, (f) wiper control means mounted on said housing, and (g) diaphragm means mounted on said housing, fluid connected to said suction pressure source, and responsive to said delivery stroke to actuate said wiper control means and responsive to said intake stroke to de-actuate said wiper control means.

4. A pneumatically operated washer pump comprising:
(a) a housing,
(b) pump means included in said housing and having an intake stroke and a delivery stroke,
(c) pump actuator means included in said housing and operably connected to said pump means, said pump actuator means responsive to pressure differentials to effect said pump means strokes,
(d) pneumatic valve means mounted on said housing and including a first valve unit connected to a source of suction pressure and reciprocable between two positions to apply pressure differentials to said pump actuator means, and including a second valve unit connected to said suction pressure source and operable to actuate said first valve unit,
(e) fluid valve means mounted on said housing, responsive to said intake stroke to supply fluid under pressure thereto, and responsive to said delivery stroke to discharge fluid therefrom, said fluid valve means operatively connected to said pneumatic valve means for supplying fluid thereto in response to said delivery stroke and maintaining said pneumatic valve means operable subsequent to a withdrawal of suction pressure therefrom,
(f) wiper control means mounted on said housing, and
(g) diaphragm means mounted on said housing, fluid connected to said suction pressure source, and responsive to said delivery stroke to actuate said wiper control means and responsive to said intake stroke to de-actuate said wiper control means.

5. A pneumatically operated washer pump comprising:
(a) a housing,
(b) pump means included in said housing and having an intake stroke and a delivery stroke,
(c) pump actuator means included in said housing and operably connected to said pump means, said pump actuator means responsive to pressure differentials to effect said pump means strokes,
(d) pneumatic valve means mounted on said housing, fluidly connected to a source of suction pressure, and fluidly connected to said pump actuator means, said pneumatic valve means operable in response to the application thereto of a suction pressure to apply pressure differentials to said pump actuator means,
(e) fluid valve means mounted on said housing and including a first valve device responsive to said intake stroke to deliver fluid under pressure to said pump means, and a second valve device operable in response to said delivery stroke to discharge said fluid therefrom, said second valve device operatively connected to said pneumatic valve means to maintain said pneumatic valve means operable subsequent to the withdrawal of said suction pressure therefrom,
(f) wiper control means mounted on said housing, and
(g) diaphragm means mounted on said housing, fluid connected to said suction pressure source, and responsive to said delivery stroke to actuate said wiper control means and responsive to said intake stroke to de-actuate said wiper control means.

6. A pneumatically operated washer pump comprising:
(a) a housing,
(b) a pump actuator chamber and a pump chamber separated therefrom, both chambers formed in said housing and in each of which a piston is reciprocally mounted,
(c) a rod reciprocally mounted in said housing and interconnecting said pistons for transmitting movement of the pump actuator piston to the pump piston so that the pump piston has an intake stroke and a delivery stroke,
(d) pneumatic valve means mounted on said housing and including a first valve unit connected to a source of suction pressure and reciprocable between two positions to apply pressure differentials to the opposite sides of the piston in the pump actuator means, and including a second valve unit connected to said suction pressure source and operable to actuate said first valve unit,
(e) fluid valve means mounted on said housing, responsive to said intake stroke to supply fluid under pressure to the pump chamber, and responsive to said delivery stroke to discharge fluid from the pump chamber, said fluid valve means operatively connected to said pneumatic valve means second valve unit for maintaining said second valve unit operable by the application of fluid thereto, subsequent to a withdrawal of suction pressure therefrom,
(f) wiper control means mounted on said housing, and
(g) diaphragm means mounted on said housing, fluid connected to said suction pressure source, and responsive to said delivery stroke to actuate said wiper control means and responsive to said intake stroke to de-actuate said wiper control means.

7. A pneumatically operated washer pump comprising:
(a) a housing,
(b) a pump actuator chamber and a pump chamber separated therefrom, both chambers formed in said housing and in each of which a piston is reciprocally mounted,
(c) a rod reciprocally mounted in said housing and interconnecting said pistons for transmitting movement of the pump actuator piston to the pump piston so that the pump piston has an intake stroke and a delivery stroke,
(d) pneumatic valve means mounted on said housing and including a first valve unit connected to a source of suction pressure and reciprocable between two positions to apply pressure differentials to the opposite sides of the piston in the pump actuator chamber, and including a second valve unit connected to said suction pressure source and operable to actuate said first valve unit,
(e) fluid valve means mounted on said housing and including a first valve device responsive to said intake stroke to deliver fluid under pressure to said pump chamber, and a second valve device operable in response to said delivery stroke to discharge said fluid therefrom, said second valve device operatively connected to said pneumatic valve means for maintaining said pneumatic valve means operable subsequent to the withdrawal of said suction pressure therefrom,
(f) wiper control means mounted on said housing and including a control member movable between on and off positions, and
(g) diaphragm means mounted on said housing, fluid connected to said suction pressure source, and operatively connected to said wiper control member, said diaphragm means responsive to said delivery stroke to actuate said wiper control member, and responsive to said intake stroke to de-actuate said wiper control means.

8. A pneumatically operated washer pump comprising:
(a) a housing,
(b) a pump actuator chamber and a pump chamber separated therefrom, both chambers formed in said housing and in each of which a piston is reciprocally mounted, (c) a rod reciprocally mounted in said housing and interconnecting said pistons for transmitting movement of the pump actuator piston to the pump piston so that the pump piston has an intake stroke and a delivery stroke, (d) pneumatic valve means mounted on said housing and including a first valve unit connected to a source of suction pressure and reciprocable between two positions to apply pressure differentials to the opposite side of the piston on the pump actuator chamber, and including a second valve unit connected to said suction pressure source and operable to actuate said first valve unit, (e) fluid valve means mounted on said housing and including a first valve device responsive to said intake stroke to deliver fluid under pressure to said pump chamber, and a second valve device operable in response to said delivery stroke to discharge said fluid therefrom, said second valve device operatively connected to said pneumatic valve means for maintaining said pneumatic valve means operable subsequent to the withdrawal of said suction pressure therefrom, (f) wiper control means mounted on said housing and including a control member movable between on and off positions, and (g) diaphragm means mounted on said housing and including a first valve assembly fluid responsive to said pump means and fluidly connected to said suction pressure source, and a second valve assembly fluidly connected to said first valve assembly and operably connected to said wiper control member, said first valve assembly operable in response to said delivery stroke to transmit said suction pressure to said second valve assembly to actuate said wiper control means, and operable in response to the intake stroke to withdraw said suction pressure from said second valve assembly to de-actuate said wiper control means.

9. A pneumatically operated washer pump comprising:

(a) a housing, (b) pump means included in said housing and having an intake stroke and a delivery stroke, (c) pump actuator means included in said housing and operably connected to said pump means, said pump actuator means responsive to pressure differentials to effect said pump means strokes, (d) pneumatic valve means mounted on said housing, fluidly connected to a source of suction pressure, and fluidly connected to said pump actuator means, said pneumatic valve means operable in response to the application of a suction pressure thereto to apply pressure differentials to said pump actuator means, (e) fluid valve means mounted on said housing, responsive to said intake stroke to supply fluid under presure thereto, and responsive to said delivery stroke to discharge fluid therefrom, said fluid valve means operatively connected to said pneumatic valve means for supplying fluid thereto in response to said delivery stroke and maintaining said pneumatic valve means operable subsequent to a withdrawal of suction pressure therefrom, (f) wiper control means mounted on said housing, (g) diaphragm means mounted on said housing, fluid connected to said suction pressure source, and responsive to said delivery stroke to actuate said wiper control means, and responsive to said intake stroke to de-actuate said wiper control means, and (h) means mounted on said housing and operatively connected to said diaphragm means for delaying the operation of said diaphragm means to deactuate said wiper control means subsequent to the completion of said delivery stroke.

10. A pneumatically operated washer pump comprising:

(a) a housing, (b) pump means included in said housing and having an intake stroke and a delivery stroke, (c) pump actuator means included in said housing and operably connected to said pump means, said pump actuator means responsive to pressure differentials to effect said pump means strokes, (d) pneumatic valve means mounted on said housing, fluidly connected to a source of suction pressure, and fluidly connected to said pump actuator means, said pneumatic valve means of a suction pressure operable in response to the application thereto to apply pressure differentials to said pump actuator means, (e) first diaphragm means mounted on said housing, including a first valve assembly fluid responsive to said pump means, and including a second valve assembly operably connected to for controlling said wiper control means, said first valve assembly operable in response to the delivery stroke of said pump means to control the operation of said second valve assembly, (f) wiper control means mounted on said housing, (g) second diaphragm means mounted on said housing, fluid connected to said suction pressure source, and responsive to said delivery stroke to actuate said wiper control means and, responsive to said intake stroke to de-actuate said wiper control means in response to said intake stroke, and (h) means mounted on said housing and operatively connected to said second diaphragm means for delaying the operation of said second diaphragm means to deactuate said wiper control means subsequent to the completion of said delivery stroke.

11. A pneumatically operated washer pump comprising:

(a) a housing, (b) a pump actuator chamber and a pump chamber separated therefrom, both chambers formed in said housing and in each of which a piston is reciprocally mounted, (c) a rod reciprocally mounted in said housing and interconnecting said pistons for transmitting movement of the pump actuator piston to the pump piston so that the pump piston has an intake stroke and a delivery stroke, (d) pneumatic valve means mounted on said housing and including a first valve unit connected to a source of suction pressure and reciprocable between two positions to apply pressure differentials to the opposite sides of the piston in the pump actuator chamber, and including a second valve unit connected to said suction pressure source and operable to actuate said first valve unit, (e) fluid valve means mounted on said housing and including a first valve device responsive to said intake stroke to deliver fluid under pressure to said pump chamber, and a second valve device operable in response to said delivery stroke to discharge said fluid therefrom, said second valve device operatively connected to said pneumatic valve means for maintaining said pneumatic valve means operable subsequent to the withdrawal of said suction pressure therefrom, (f) wiper control means mounted on said housing and including a control member movable between on and off positions, (g) diaphragm means mounted on said housing and including a first valve assembly fluid responsive to said pump means and fluidly connected to said suction pressure source, and a second valve assembly fluidly connected to said first valve assembly and operably connected to said wiper control member, said first valve assembly operable in response to said delivery stroke to transmit said suction pressure to said second valve assembly to actuate said wiper control means, and operable in response to the intake stroke to withdraw said suction pressure from said second valve assembly to deactuate said wiper control means, and (h) manually adjustable means mounted on said housing for venting said diaphragm means second valve assembly to the atmosphere to controllably delay the action of said second valve assembly in de-actuating said wiper control means.

12. In a washer pump apparatus,
(a) a housing having first and second fluid chambers,
(b) piston means reciprocally mounted in each chamber and interconnected by a common rod,
(c) first fluid valve means mounted on said housing and operable to apply fluid pressure differentials to the opposite sides of the piston means in the first fluid chamber so that the piston means in the second chamber has an intake stroke, a delivery stroke, and
(d) second fluid valve means mounted on said housing and including a first valve device responsive to said intake stroke to deliver fluid to the second fluid chamber, and a second valve device operable in response to fluid pressure developed by said delivery stroke to discharge said fluid therefrom, said second valve device being operatively connected to said first valve means for holding said first valve means during the discharge of fluid from the second fluid chamber and releasing said first valve means after the fluid has been discharged from the second fluid chamber.

13. In a pneumatically operated water pump,
(a) a housing,
(b) a pump actuator chamber and a pump chamber separated therefrom, both chambers formed in said housing and in each of which a piston is reciprocally mounted,
(c) a rod reciprocally mounted in said housing and interconnecting said pistons for transmitting movement of the pump actuator piston to the pump piston so that the pump piston has an intake stroke and a delivery stroke,
(d) pneumatic valve means mounted on said housing and including a first valve unit connected to a source of suction pressure and reciprocable between two positions to apply pressure differentials to the opposite sides of the piston in the pump actuator chamber, and including a second valve unit connected to said suction pressure source and operable to actuate said first valve unit, and
(e) fluid valve means mounted on said housing and including a first valve device responsive to said intake stroke to deliver fluid under pressure to said pump chamber, and a second valve device operable in response to said delivery stroke to discharge said fluid therefrom, said second valve device operatively connected to said pneumatic valve means for maintaining said pneumatic valve means operable subsequent to the withdrawal of said suction pressure therefrom.

14. A pneumatically operated washer pump comprising:
(a) a housing,
(b) a pump actuator chamber and a pump chamber separated therefrom, both chambers formed in said housing and in each of which a piston is reciprocally mounted,
(c) a rod reciprocally mounted in said housing and interconnecting said pistons for transmitting movement of the pump actuator piston to the pump piston so that the pump piston has an intake stroke and a delivery stroke,
(d) pneumatic valve means mounted on said housing and including a first valve unit connected to a source of suction pressure and reciprocable between two positions to apply pressure differentials to the opposite sides of the piston in the pump actuator chamber, and including a second valve unit connected to said suction pressure source and operable to actuate said first valve unit,
(e) fluid valve means mounted on said housing responsive to said intake stroke to deliver fluid to said pump chamber.
(f) wiper control means mounted on said housing and including a control member movable between on and off positions,
(g) diaphragm means mounted on said housing and including a first valve assembly fluid responsive to said pump means and fluidly connected to said suction pressure source, and a second valve assembly fluidly connected to said first valve assembly and operably connected to said wiper control member, said first valve assembly operable in response to said delivery stroke to transmit said suction pressure to said second valve assembly to actuate said wiper control means, and operable in response to the intake stroke to withdraw said suction pressure from said second valve assembly to de-actuate said wiper control means, and
(h) manually adjustable means mounted on said housing for venting said diaphragm means second valve assembly to the atmosphere to controllably delay the action of said second valve assembly in de-actuating said wiper control means.

References Cited in the file of this patent

UNITED STATES PATENTS

| | | |
|---|---|---|
| 2,094,135 | Porter | Sept. 28, 1937 |
| 2,153,519 | Horton | Apr. 4, 1939 |
| 2,877,485 | Oishei | Mar. 17, 1959 |
| 3,025,551 | Oishei | Mar. 20, 1962 |